US009207806B2

(12) United States Patent
Burtner et al.

(10) Patent No.: US 9,207,806 B2
(45) Date of Patent: Dec. 8, 2015

(54) CREATING A VIRTUAL MOUSE INPUT DEVICE

(75) Inventors: Edwin Russ Burtner, Everett, WA (US); V. Kevin Russ, Bellevue, WA (US); Ian M. Sands, Seattle, WA (US); John A. Snavely, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 300 days.

(21) Appl. No.: 12/474,225

(22) Filed: May 28, 2009

(65) Prior Publication Data

US 2010/0302144 A1 Dec. 2, 2010

(51) Int. Cl.
*G06F 3/033* (2013.01)
*G06F 3/042* (2006.01)
*G06F 3/041* (2006.01)
*G06F 3/0488* (2013.01)
*G06F 3/0489* (2013.01)

(52) U.S. Cl.
CPC ............ *G06F 3/042* (2013.01); *G06F 3/0416* (2013.01); *G06F 3/0488* (2013.01); *G06F 3/0489* (2013.01)

(58) Field of Classification Search
CPC ..... G06F 3/033; G06F 3/0416; G06F 3/0488; G06F 3/0489; G06F 3/042
USPC .......................... 345/156–157, 173; 715/700
See application file for complete search history.

(56) References Cited

U.S. PATENT DOCUMENTS 5,825,352 A * 10/1998 Bisset et al. .................. 345/173
7,242,387 B2 * 7/2007 Fitzmaurice et al. ......... 345/157
7,337,410 B2    2/2008 Lin ............................... 715/773
7,339,580 B2    3/2008 Westerman et al. .......... 345/173
2003/0080947 A1 * 5/2003 Genest et al. ................. 345/173
2004/0141015 A1 * 7/2004 Fitzmaurice et al. ......... 345/856
2005/0024324 A1 * 2/2005 Tomasi et al. ................ 345/156
2005/0225538 A1   10/2005 Verhaegh ...................... 345/173
2006/0125803 A1    6/2006 Westerman et al. .......... 345/173
2006/0227099 A1 * 10/2006 Han et al. ...................... 345/156
2007/0152966 A1    7/2007 Krah et al. .................... 345/163
2007/0236475 A1 * 10/2007 Wherry ......................... 345/173
2007/0257891 A1 * 11/2007 Esenther et al. .............. 345/173
2007/0262964 A1 * 11/2007 Zotov et al. ................... 345/173
2008/0106523 A1    5/2008 Conrad ......................... 345/173

(Continued)

OTHER PUBLICATIONS

Stack Overflow; "*Is there Real Value in Multi-Touch Interface for a Desktop?*"; http://stackoverflow.com/questions/413977/is-there-real-value-in-multi-touch-interface-for-a-desktop; 2 pgs.

(Continued)

*Primary Examiner* — Towfiq Elahi
(74) *Attorney, Agent, or Firm* — Jessica Meyers; Danielle Johnston-Holmes; Micky Minhas

(57) ABSTRACT

A virtual mouse input device is created in response to a placement of a card on a touch surface. When the card is placed on the touch surface, the boundaries of the card are captured and a virtual mouse appears around the card. The virtual mouse may be linked with a user through an identifier that is contained on the card. Other controls and actions may be presented in menus that appear with the virtual mouse. For instance, the user may select the type of input (e.g. mouse, keyboard, ink or trackball) driven by the business card. Once created, the virtual mouse is configured to receive user input until the card is removed from the touch surface. The virtual mouse is configured to move a cursor on a display in response to movement of the card on the touch surface.

20 Claims, 7 Drawing Sheets

(56) References Cited

U.S. PATENT DOCUMENTS

| | | | |
|---|---|---|---|
| 2008/0128182 A1 | 6/2008 | Westerman et al. | 178/18.06 |
| 2008/0165132 A1 | 7/2008 | Weiss et al. | 345/173 |
| 2008/0229194 A1* | 9/2008 | Boler et al. | 715/700 |
| 2008/0297483 A1 | 12/2008 | Kim | |
| 2009/0027330 A1* | 1/2009 | Aida | 345/156 |
| 2009/0289911 A1 | 11/2009 | Nagai | |
| 2010/0302155 A1 | 12/2010 | Sands et al. | 345/163 |

OTHER PUBLICATIONS

Moscovich, et al.; "*Multi-Finger Cursor Techniques*"; http://www.moscovich.net/tomer/papers/multifcursors-gi2006.pdf; 7 pgs.

U.S. Appl. No. 12/474,205, filed May 28, 2009, entitled "Virtual Input Devices Created by Touch Input".

Moscovich, T.; "*Multi-touch Interaction*"; http://www.moscovich.net/tomer/papers/multi-touch-CHI-DC.pdf; Apr. 22-27, 2006; 4 pgs.

Wikipedia; "*Microsoft Surface*"; http://en.wikipedia.org/wiki/Microsoft_Surface; Apr. 17, 2008; 9 pgs.

Leitner, J.; "*Multitouch @ Laval Virtual*"; http://mi-lab.org/blog/2008/04/17/multitouch-laval-virtual/; Apr. 17, 2008; 6 pgs.

George, J., et al.; "*Tabletop Computers as Assistive Technology, Jennifer George & Gilbert Cockton*"; http://shareitproject.org/workshop/TableTopas%20George%20AT__100708.doc; 2 pgs.

Under Mouse Arrest; "*Microsoft's Multi-Touch 'Surface' Table computer launched by Microsoft*"; http://www.under-mouse-arrest.com/2007__05__01__archive.html; May 31, 2007; 24 pgs.

Office Action mailed Jan. 18, 2012, in U.S. Appl. No. 12/474,205.
Office Action mailed Jan. 25, 2013, in U.S. Appl. No. 12/474,205.
Office Action mailed Jun. 5, 2014, in U.S. Appl. No. 12/474,205.
Office Action mailed Jun. 8, 2012, in U.S. Appl. No. 12/474,205.
Office Action mailed Jun. 19, 2013, in U.S. Appl. No. 12/474,205.
Office Action mailed Oct. 1, 2014, in U.S. Appl. No. 12/474,205.
Office Action mailed Oct. 30, 2013, in U.S. Appl. No. 12/474,205.
Notice of Allowance mailed May 14, 2015, in U.S. Appl. No. 12/474,205.

* cited by examiner

CREATING A VIRTUAL MOUSE INPUT DEVICE

BACKGROUND

Computer display devices have been configured to function both as an input device and as a video output device. For example, computer display devices can be configured with touch surface mechanisms that allow users to enter user input data through a display surface. Sensors can detect when one or more objects contact a particular location on the display surface. A computer system can then perform some action in response to detecting the contact. For example, in response to detecting contact between an object and a display surface at a location corresponding to user-interface control, a computer system can perform some action associated with the user-interface control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A virtual mouse input device is created in response to a placement of a card on a touch surface. When the card is placed on the touch surface, the boundaries of the card are captured and a virtual mouse appears around the card. The virtual mouse may be linked with a user through an identifier that is contained on the card. Other controls and actions may be presented in menus that appear with the virtual mouse. For instance, the user may select the type of input (e.g. mouse, keyboard, ink or trackball) driven by the business card. Once created, the virtual mouse is configured to receive user input until the card is removed from the touch surface. The virtual mouse is configured to move a cursor on a display in response to movement of the card on the touch surface.

DETAILED DESCRIPTION

Figure 1:
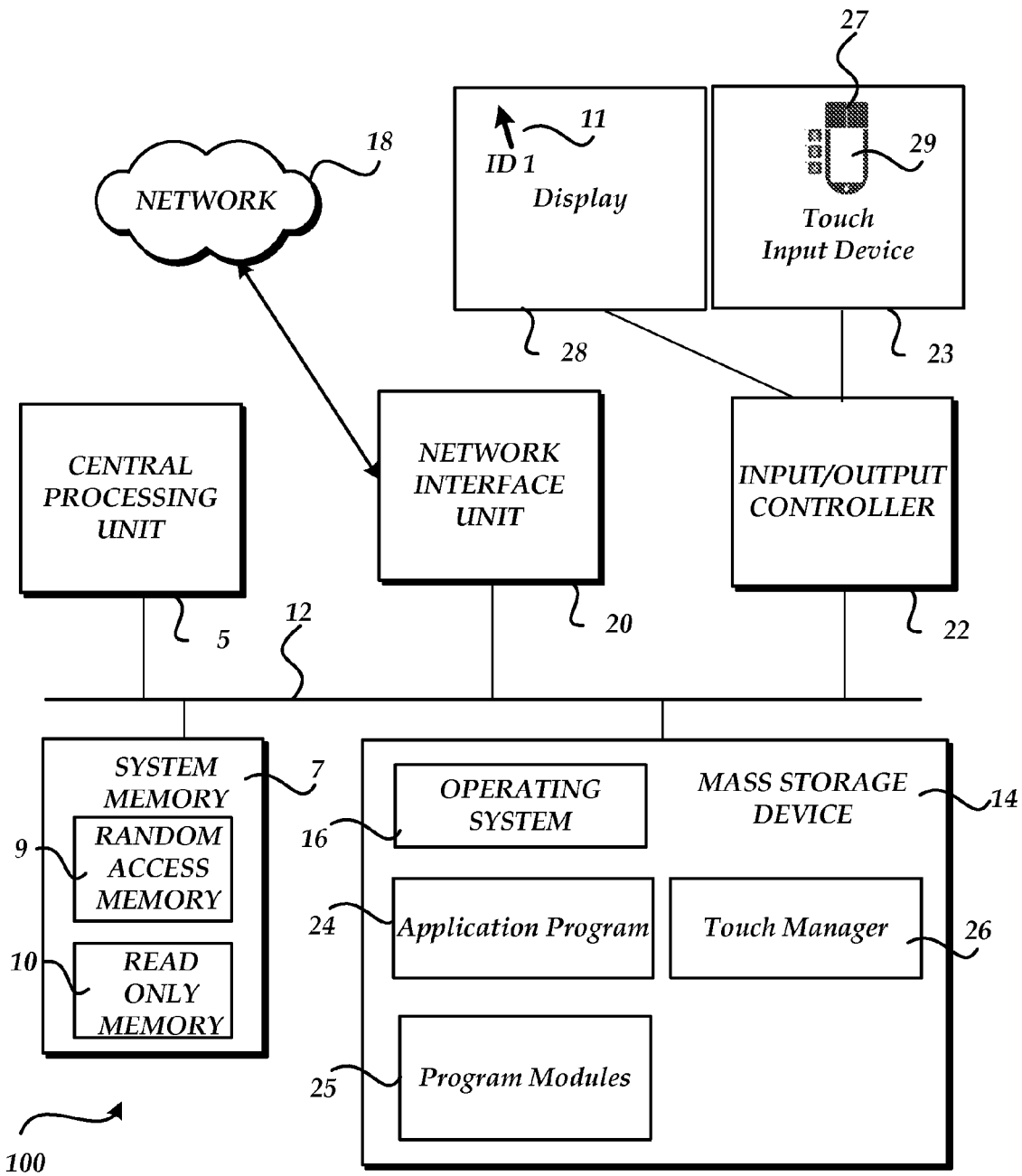
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program(s) 24, and other program modules 25, and touch manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Figure 2:
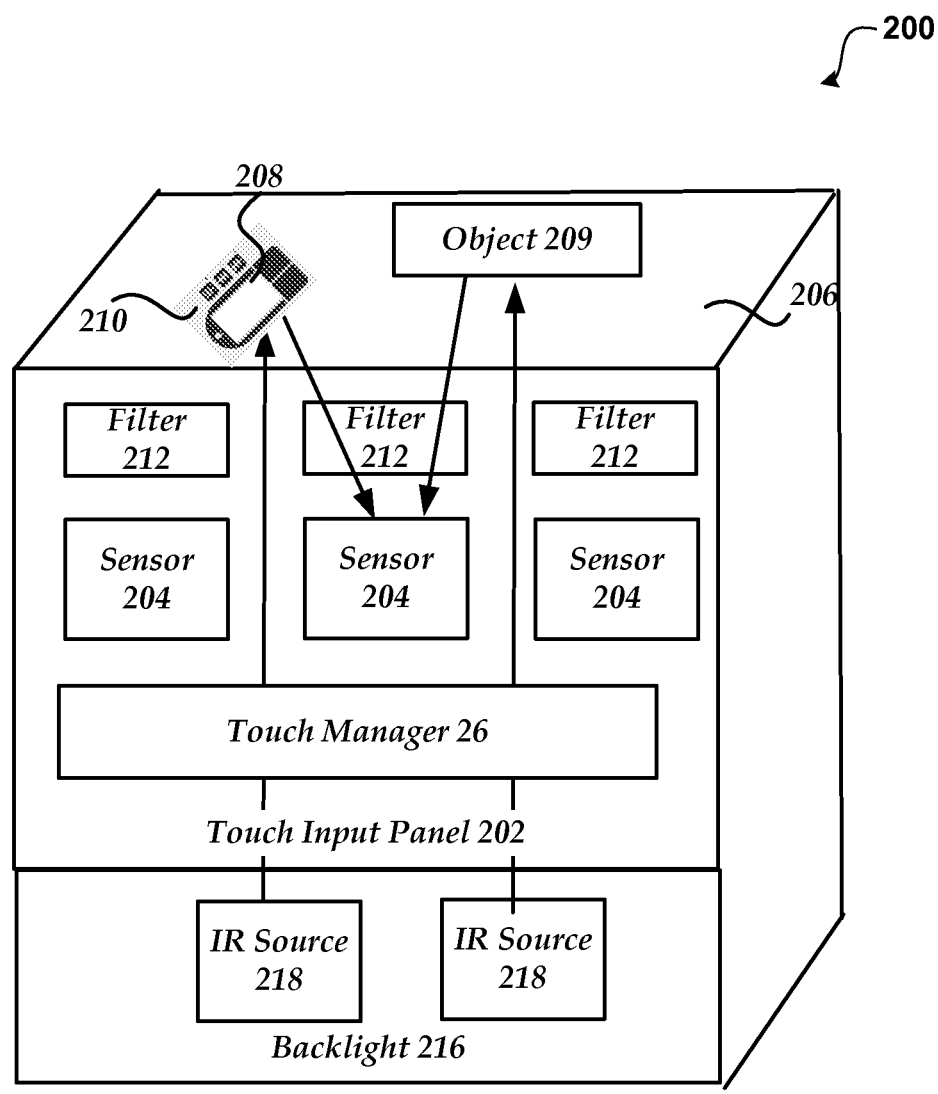
FIG. 2 illustrates an exemplary touch input system.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a touch input device 23. The touch input device may utilize any technology that allows more than one touch input to be recognized at a time. For example, the technologies may include, but are not limited to: heat, finger pressure, high capture rate cameras, infrared light, optic capture, tuned electromagnetic induction, ultrasonic receivers, transducer microphones, laser range finders, shadow capture, and the like. An exemplary touch input device is shown in FIG. 2. The touch input device 23 may also act as a display.

The input/output controller 22 may also provide output to one or more display screens, such as display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS® VISTA® or WINDOWS® 7® operating system from MICROSOFT CORPORATION of Redmond, Wash. According to one embodiment, the operating system is configured to include support for touch input device 23. According to another embodiment, a touch manager 26 may be utilized to process some/all of the touch input that is received from touch input device 23.

The mass storage device 14 and RAM 9 may also store one or more program modules. In particular, the mass storage device 14 and the RAM 9 may store one or more application programs 24. In conjunction with the operation of the application, touch manager 26 provides a virtual mouse input device 27 that is created in response to a card 29 being placed on a surface of touch input device 23. When the card 29 is placed on the touch surface 23, the boundaries of the card 27 are captured and a virtual mouse 27 appears around the card 29. The virtual mouse 27 may be linked with a user through an identifier that is contained on the card. The identifier may be used to identify a display of a cursor on a display. For example, cursor 11 on display 28 is associated with a user having an ID 1. Other controls and actions may be presented in menus that appear with the virtual mouse. In the present example, the user may select an avatar to associate with a cursor, the type of input (e.g. mouse, keyboard, ink or trackball) driven by the business card, a voting button, and an option to switch the virtual mouse between a right handed mouse and a left handed mouse. Once created, the virtual mouse is configured to receive user input until the card is removed from the touch surface. The virtual mouse is configured to move a cursor on a display (e.g. cursor 11) in response to movement of the card on the touch surface. The virtual mouse may include zero or more mouse buttons. The virtual buttons may be configured to activate functions associated with application 24 or some other function and/or program. As illustrated, virtual mouse 27 includes two mouse buttons. Once the virtual mouse is created, the user may use the mouse to interact with functionality that is provided by application 24 and/or some other application. The virtual mouse input device 27 is removed when the card is no longer placed on the touch surface. Additional details regarding the virtual mouse input device will be provided below.

FIG. 2 illustrates an exemplary touch input system. Touch input system 200 as illustrated comprises a touch panel 202 that has several sensors 204 integrated therein. According to one embodiment, the sensors 204 are Infrared (IR) sensors. Objects that in contact with or above a touchable surface 206 include a card 208 that is in contact with touchable surface 206 and an object 209 that is close to but not in actual contact with ("adjacent") touchable surface 206. Object 209 may be another card and/or some other physical object. Infrared sensors 204 are distributed throughout touch panel 202 and are disposed parallel to touchable surface 206. One or more of the infrared sensors 204 may detect infrared radiation reflected from the objects 208 and 209, as indicated by the arrows. Although the term "above" is used in this description, it should be understood that the orientation of the touch panel system is irrelevant. As shown in FIG. 2, touchable surface 206 is horizontal, but in a different embodiment generated by rotating system 200 clockwise by 90 degrees, touchable surface 206 could be vertical. In that embodiment, the objects from which reflected IR radiation is detected are to the side of touchable surface 206. The term "above" is intended to be applicable to all such orientations.

Touch panel 202 may comprise filters 212 that absorbs visible light and transmits infrared radiation and are located between touchable surface 206 and IR sensors 204 in order to shield IR sensors 204 from visible light 214 incident on touchable surface 206 in the case where IR sensors 204 are sensitive to a broader range of wavelengths of light other than purely infrared wavelengths.

Touch panel 202 may comprise a display that is configured to display images that are viewable via touchable surface 206. For example, the displayed image may be images relating to an application and/or a display of the virtual mouse input device 210 that is created in response to a card, such as a business card, being detected on touchable surface 206. The display may be, for example, an LCD, an organic light emitting diode (OLED) display, a flexible display such as electronic paper, or any other suitable display in which an IR sensor can be integrated.

System 200 may comprise a backlight 216 for the display. Backlight 216 may comprise at least one IR source 218 that is configured to illuminate objects in contact with or adjacent to touchable surface 206 with infrared radiation through touchable surface 206, as indicated by the arrows. IR sensor 204$s$ are sensitive to radiation incident from above, so IR radiation traveling directly from backlight 216 to IR sensor 204$s$ is not detected.

The output of sensors 204 may be processed by touch manager 26 and/or functionality included within an operating system or some other application to detect when a physical object (e.g., a card, a hand, a bottle, a glass, a finger, a hat, etc.) has come into physical contact with a portion of the touch input surface 206 and/or a physical object is in close proximity to the surface. For example, sensors 204 can detect when a card 208 has come in contact with touch input display surface 206. Additional sensors can be embedded in the touch input display surface 206 and can include for example, pressure sensors, temperature sensors, image scanners, barcode scanners, etc., to detect multiple simultaneous inputs. For example, an optical character recognition scanner may be included to determine text that is on a business card. The recognized text may then be used to associate the mouse and related cursor with an identified individual.

When the sensors 204 are IR sensors, the IR radiation reflected from the objects may be reflected from a user's hands, fingers, reflective ink patterns on the objects, metal designs on the objects or any other suitable reflector. Fingers reflect enough of the near IR to detect that a finger or hand is located at a particular location on or adjacent the touchable surface. A higher resolution of IR sensors may be used to scan objects in order to achieve higher resolution.

Sensors 204 can be included (e.g., embedded) in a plurality of locations. The density of sensors 204 can be sufficient such that contact across the entirety of touch input surface 206 can be detected. Sensors 204 are configured to sample the surface of touch input display surface 206 at specified intervals, such as, for example, 1 ms, 5 ms, etc. for detected contact and/or near contact. The sensor data received from sensors 204 changes between sampling intervals as detected objects move on the touch surface; detected objects are no longer within range of detection; and when new object come in range of detection. For example, touch manager 26 can determine that contact was first detected at a first location and then contact was subsequently moved to other locations. In response, the virtual mouse input device 210 and an associated cursor on a display may be moved to correspond to the movement of the card 208 on the touch surface. Similarly, upon receiving an indication that the card is no longer contacting anywhere on touch input surface the virtual mouse input may be removed.

FIG. 2 provides just one example of a touch input system. In other exemplary touch systems, the backlight may not comprise any IR sources and the surface 206 may include a frontlight which comprises at least one IR source. In such an example, the touchable surface 206 of the system is a surface of the frontlight. The frontlight may comprise a light guide, so that IR radiation emitted from IR source travels through the light guide and is directed towards touchable surface and any objects in contact with or adjacent to it. In other touch panel systems, both the backlight and frontlight may comprise IR sources. In yet other touch panel systems, there is no backlight and the frontlight comprises both IR sources and visible light sources. In further examples, the system may not comprise a frontlight or a backlight, but instead the IR sources may be integrated within the touch panel. In an implementation, the touch input system 200 may comprise an OLED display which comprises IR OLED emitters and IR-sensitive organic photosensors (which may comprise reverse-biased OLEDs). In some touch systems, a display may not be included. Even if the touch system comprises one or more components or elements of a display, the touch system may be configured to not display images. For example, this may be the case when the touch input tablet is separate from a display. Other examples include a touchpad, a gesture pad, and similar non-display devices and components.

For some applications, it may be desirable to detect an object only if it is in actual contact with the touchable surface of the touch panel system. For example, according to one embodiment, the virtual mouse input device 210 is only created when a card is placed on the touchable surface 206. The IR source of the touch input system may be turned on only if the touchable surface is touched. Alternatively, the IR source may be turned on regardless of whether the touchable surface is touched, and detection of whether actual contact between the touchable surface and the object occurred is processed along with the output of the IR sensor. Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Figure 3:
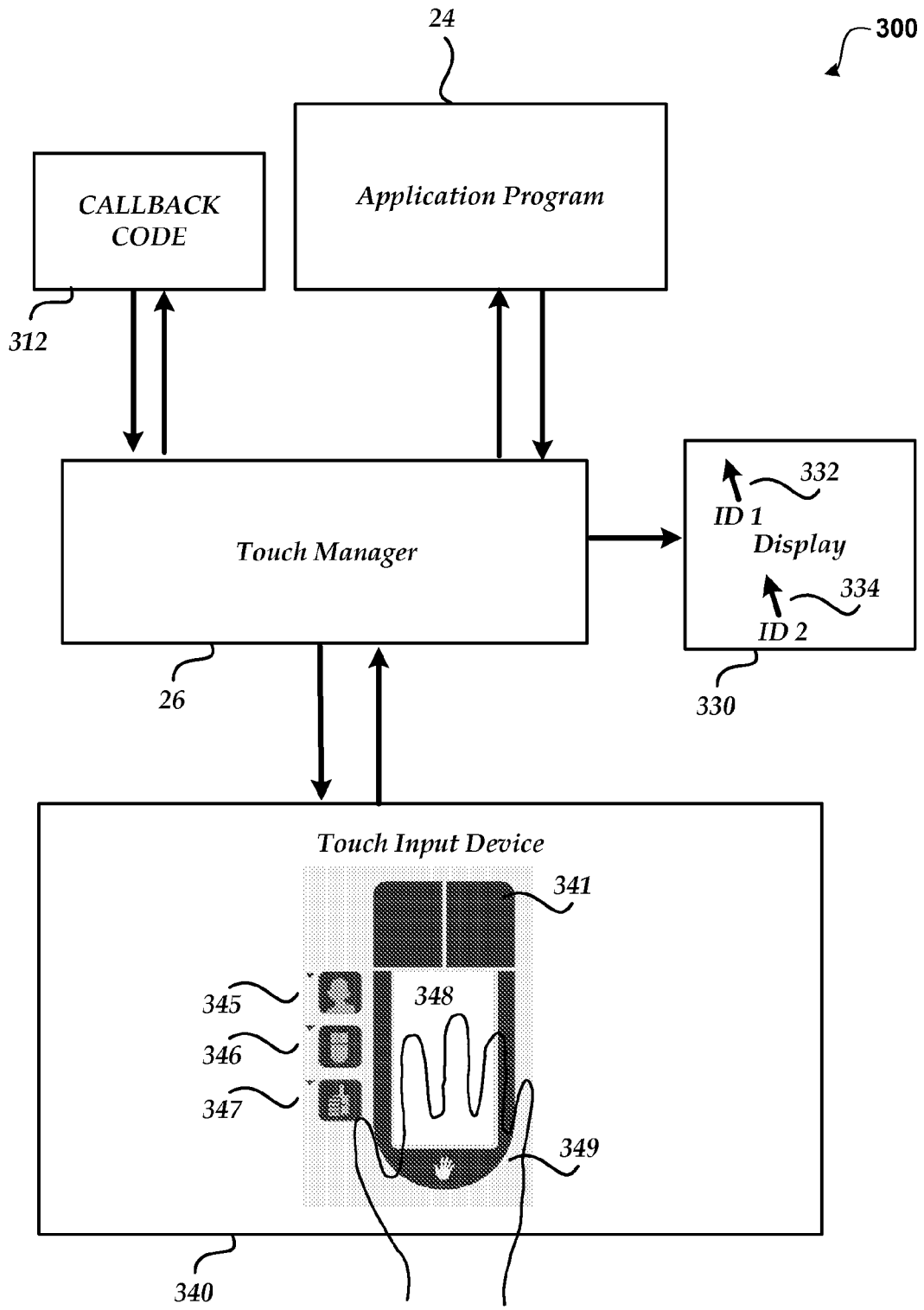
FIG. 3 shows a system for creating a virtual mouse input device in response to a card being placed on a touch surface.

FIG. 3 shows a system 300 for creating a virtual mouse input device in response to a card being placed on a touch surface. As illustrated, system 300 includes application program 24, callback code 312, touch manager 26, display 330, and touch input device 340.

In order to facilitate communication with the touch manager 26, one or more callback routines, illustrated in FIG. 3 as callback code 312 may be implemented. According to one embodiment, application program 24 is configured to receive input from a touch-sensitive input device 340. For example, touch manager 26 may provide an indication to application 24 when a card (i.e. card 348) is placed on a touch surface of the touch input device 340.

According to one embodiment, a virtual mouse input device is shown on the display of touch input device 340 when a user places a business card on the touch surface. While only one touch input device is illustrated, more touch input devices may be included within the system. Additionally, more than one card may be placed on a touch surface that results in a virtual mouse being created. For example, a touch surface may be large enough to allow multiple users to interact with one or more applications using the same touch surface.

In response to card 348 being placed on the touch surface, touch manager 26 determines the boundaries of the card and displays a virtual mouse around the boundary. When a user moves card 348, an associated cursor (i.e. cursor 332) is moved along with the virtual mouse moving on the display of the touch input device. Similarly, when the user taps one of their fingers on a virtual mouse button, a function relating to application 24 and/or some other function may be invoked. In the current example, a user may select from one of two virtual mouse buttons. As illustrated, virtual mouse 341 includes three different menu choices (345, 346, and 347) that are located near the mouse. More or fewer menu choices may be provided. Menu option 345 allows a user to select an avatar to be associated with the mouse. For example, instead of showing ID 1 with the display of cursor 332, the selected avatar may be shown. Menu option 346 allows a user to select the type of input that is driven by the card. According to one embodiment, the input may be a mouse, a stylus for inking, a trackball and a keyboard. Menu option 347 provides a user with a voting option. Other menu options may be provided based on the current context. For example, when virtual mouse 341 is interacting with a first application a first set of menu options may be provided and when the user is interacting with a second application a second set of menu options may be provided. The menu options may also change based on previous selections. Either virtual input device 345, 346 may be used to move cursor 332.

According to one embodiment, when card 348 is placed on the touch surface, touch manager 26 performs a check for an identifier on the business card. The identifier may be any type of identifier that may be sensed. For example, the identifier may be a glyph, a barcode, text (i.e. a name), a magnetic strip, and the like. When the card 348 is a business card, touch manager 26 may perform an OCR to determine the text that is contained on the card to determine a user that is associated with the card. When the card 348 is linked to a particular user, an ID may be automatically associated with the virtual mouse. For example, when an ID is determined an avatar may be automatically selected and associated with the cursor that is driven by virtual mouse 341. In this case, the menu option 345 may be removed from the display and some other option may be placed in that location if desired. When an identifier is not determined from the card, the user can select an avatar and a color for use on the digital mouse and cursor using menu option 345. This identification helps in multiple cursor support as well as quick identification of which mouse controls which cursor on a display containing multiple cursors. For example, display 330 shows two cursors that are controlled by two different input devices.

As opposed to a hardware input device, the virtual mouse input device is only activated when a card is placed on the touch surface. In this way, the virtual mouse is hidden when not needed by a user. Additionally, using a virtual input mouse allows a user to keep their hands on the touch surface without having to reach for a hardware mouse.

Figure 4:
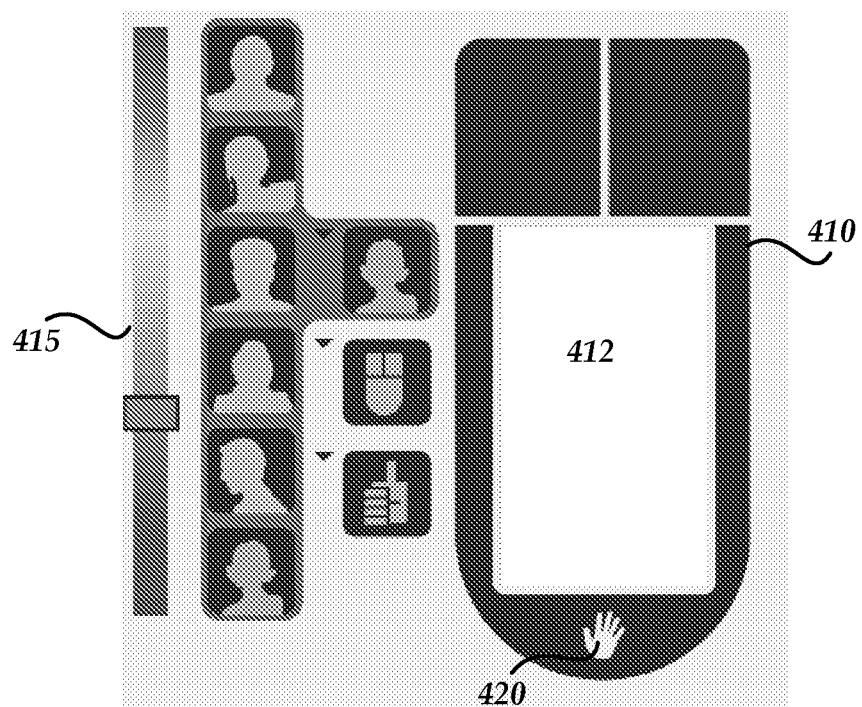
FIG. 4 shows exemplary virtual input devices 400.
Figure 5:
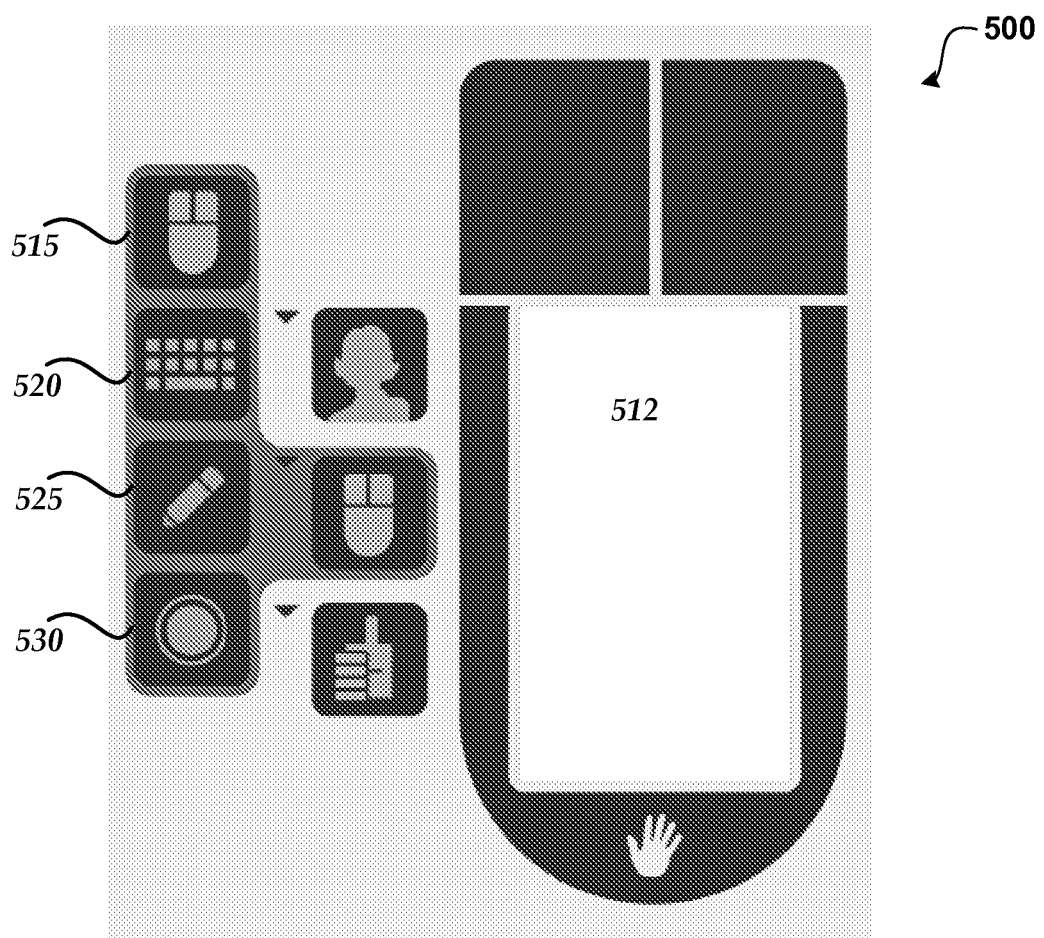
FIG. 5 shows an illustrative process for creating a virtual input device.
Figure 6:
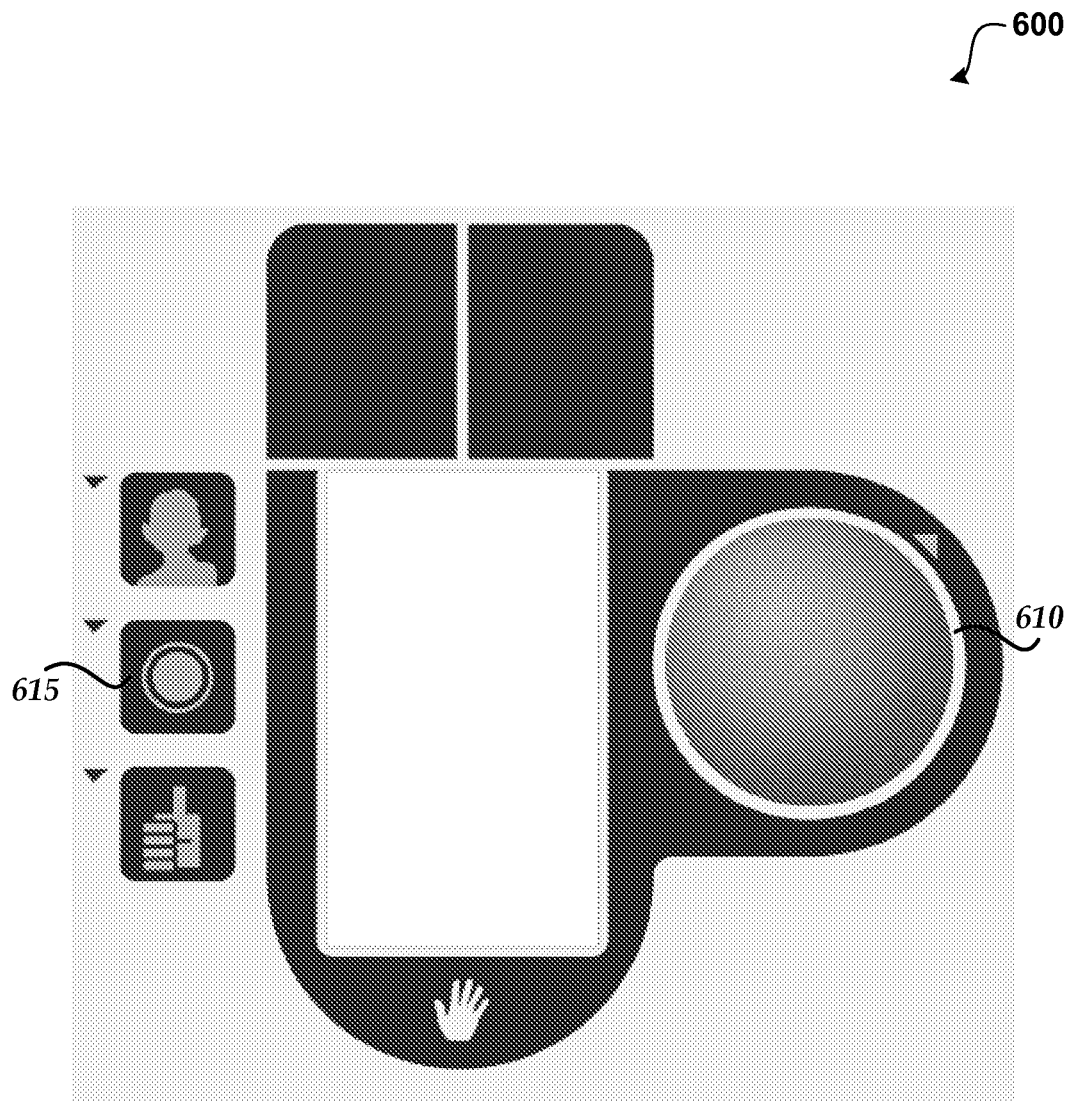
FIG. 6 illustrates a display of a virtual mouse with a trackball input.

FIGS. 4-6 show exemplary virtual mouse input devices.

Referring now to FIG. 4, a virtual mouse 410 mouse is displayed around a business card 412. Virtual mouse 410 works like a hardware mouse, moving card 412 left, right, up and down moves an associated cursor in the same direction. Left and right click ability using the virtual mouse buttons is programmable and is also similar to its hardware counterpart.

Option 420 allows a user to change the virtual mouse to be left handed or right handed. A right handed virtual mouse has the controls on the left, while a left handed mouse has the controls on the right.

In the example illustration, a user has selected the avatar button which has pulled up a list of avatars to select from. A slider bar 415 is also displayed that allows a user to associate a color with the virtual mouse.

FIG. 5 illustrates a user selecting a type of input to be driven by the card that is placed on the touch surface.

Option 515 is the standard mouse input. Option 520 is a keyboard input. According to one embodiment, the keyboard is a digital "QWERTY" keyboard that displays off to the side of the card 512 and allows the user to type text. Other keyboards and/or display locations may be utilized.

Option 525 is an ink input. According to one embodiment, selecting ink option 525 displays a small canvas next to card 512 that allows the user to ink text and pictures with their fingers.

Option 530 is a trackball input. The trackball input is configured to work like a hardware trackball, rolling the ball left, right, up and down moves the cursor in the same direction, double clicking the ball works as a right click on a mouse.

FIG. 6 illustrates a display of a virtual mouse with a trackball input. As illustrated, virtual mouse 600 includes trackball 610 that may be interacted with in the same manner as a hardware trackball. For example, a user may slide their fingers across the trackball to move a cursor. As can be seen, option 615 has changed to indicate that the input method is a trackball.

Figure 7:
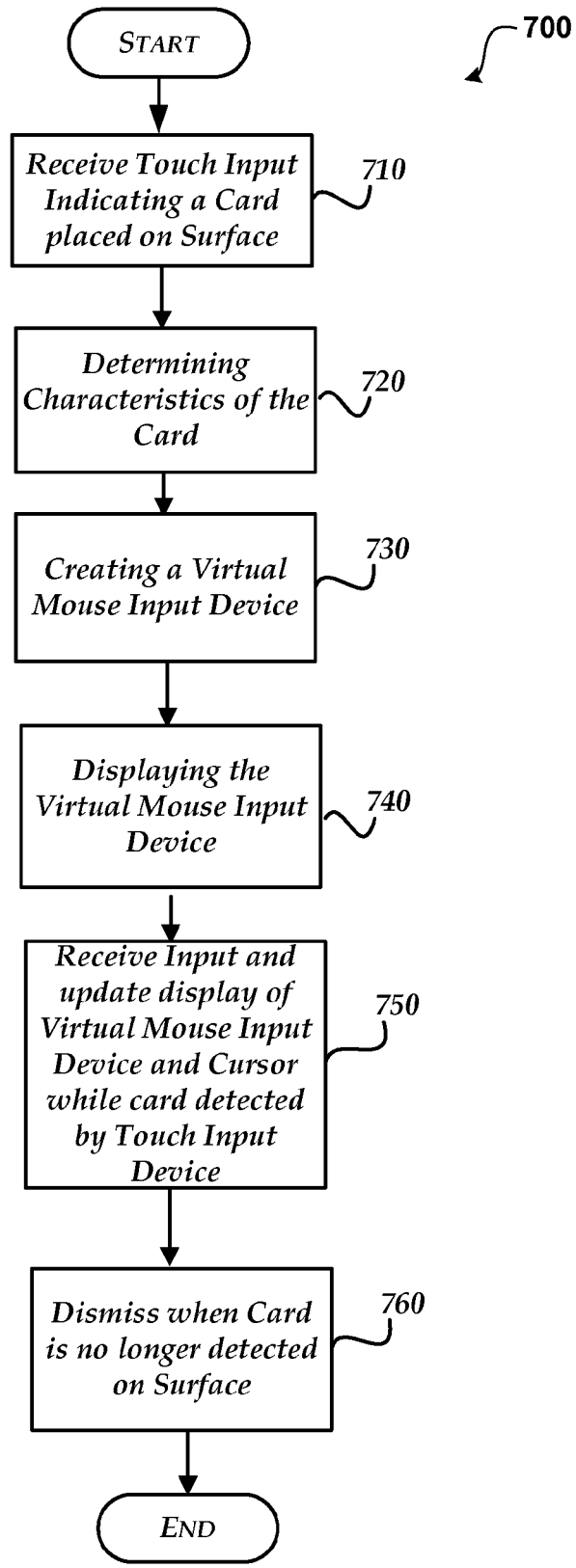
FIG. 7 shows an illustrative process for creating a virtual mouse input device.

Referring now to FIG. 7, an illustrative process 700 for creating a virtual mouse input device will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 710, where a touch input is received indicating that card has been detected. According to one embodiment, the user places a business card on the touch surface.

Moving to operation 720, characteristics of the card are determined. According to one embodiment, the boundaries of the card are determined and an identifier for the card is attempted to be determined. As discussed above, the card may be identified a glyph, content on the business card, or some other identifying means included by the card that may be sensed.

Flowing to operation 730, the virtual mouse input device is created. According to one embodiment, a mouse input device is the default device created. According to other embodiments, the input that is driven by the card may be selected based on the identifier that is associated with the card and/or an application that is currently being used by a user. For example, one user may have a preference for a trackball input device, whereas another user may prefer the virtual mouse.

Transitioning to operation 740, the virtual mouse input device is displayed. According to one embodiment, the virtual input device is displayed beneath a portion of the user's hand. According to one embodiment, the virtual mouse is displayed around the borders of the card on the touch surface. Additionally, a virtual input device may be created and displayed for each card that is detected by the touch surface.

Moving to operation 750, the virtual input device(s) displayed receives input from the user while the card is detected by the touch input device. For example, a user may move the card across the touch surface causing a cursor to also move, a user may pick a finger up and then press the finger down to select a menu option or a mouse button, and the like.

Flowing to operation 760, the virtual mouse input device is removed when the card is no longer positioned on the touch surface.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for creating a virtual mouse input device, comprising:
 determining when an object is detected by a touch input device;
 determining when the object is a card;
 determining when the card includes an identifier;
 when the card is determined to include the identifier, parsing the identifier to identify a specific user;
 creating a virtual mouse input device in response to the card being detected by the touch input device;
 sizing the virtual mouse input device according to a size of the card such that the virtual mouse input device is larger than the size of the card;
 providing one or more applications associated with the virtual mouse input device, one of the one or more applications including selectable menu options for setting a type of input that is driven by the virtual mouse input device based on selection of a menu option;
 displaying the virtual mouse input device at a location on a display of the touch input device around borders of the placed card while the card is detected by the touch input device; and
 receiving user input from the virtual mouse input device while the card is detected by the touch input device; wherein a position of the virtual mouse input device moves on the display in response to a movement of the location of the card that is detected by the touch input device.

2. The method of claim 1, further comprising linking the virtual mouse input device to the specific user, wherein linking the virtual mouse input device to the specific user comprises associating the identifier with a cursor that is displayed on a different screen such that the cursor is identified with the created virtual mouse input device such that the different screen is operable to display the associated cursor on subsequent identifications of the specific user.

3. The method of claim 1, further comprising determining a boundary of the card and displaying the virtual mouse around the boundary of the card.

4. The method of claim 1, wherein the virtual mouse input device includes a virtual option for switching the virtual mouse input device between a left handed virtual mouse input device and a right handed virtual mouse input device.

5. The method of claim 1, wherein the virtual mouse input device comprises virtual options to select an avatar to be associated with the virtual mouse input device and a type of input that is supported by the virtual mouse input device.

6. The method of claim 1, wherein the type of input supported comprises: a mouse input, a keyboard input, an ink input, and a trackball input.

7. The method of claim 3, wherein the virtual options change in response to a context that is associated with a current application being interacted with by the specific user.

8. A computer-readable storage device excluding a signal having computer-executable instructions for creating a virtual mouse input device in response to a touch input, comprising:
   determining when a business card is placed on a touch surface;
   creating a virtual mouse input device in response to the business card being detected by the touch input device;
   sizing the virtual mouse input device according to a size that is larger than the business card;
   displaying the virtual mouse input device at a location on a display of the touch input device around borders of the placed business card that is updated in response to the location of the business card changing;
   associating the virtual mouse input device with a specific user based on an identifier on the business card, wherein the identifier comprises text on the business card;
   providing one or more applications associated with the virtual mouse input device, one of the one or more applications including selectable menu options for setting a type of input that is driven by the virtual mouse input device based on selection of a menu option; and
   receiving input from the virtual mouse input device while the business card is on the touch surface; wherein the virtual mouse input device controls a location of a cursor.

9. The computer-readable storage device of claim 8, wherein associating the virtual mouse input device with the specific user comprises associating a graphical avatar with the cursor that is displayed on a different screen.

10. The computer-readable storage device of claim 8, further comprising determining a boundary of the card and displaying the virtual mouse around the boundary of the card.

11. The computer-readable storage device of claim 10, wherein the virtual mouse input device includes virtual options that comprise an option for switching the virtual mouse input device between a left handed virtual mouse input device and a right handed virtual mouse input device and a virtual option to select a type of input that is driven by the virtual mouse input device.

12. The computer-readable storage device of claim 11, wherein the type of input supported comprises: a mouse input, a keyboard input, an ink input, and a trackball input.

13. The computer-readable storage medium of claim 8, wherein the virtual options change in response to a context that is associated with a current application being interacted with by the virtual mouse input device.

14. A system for creating and interacting with a virtual mouse input device created in response to touch inputs, comprising:
   a touch surface that is configured to receive multiple touches;
   a processor and a computer-readable medium;
   an operating environment stored on the computer-readable medium and executing on the processor; and
   a touch manager operating under the control of the operating environment and operative to:
      determine when a card that includes an identifier for a user is placed on the touch surface;
      parse the identifier via optical character recognition;
      identify the user based on the parsed identifier;
      create a virtual mouse input device in response to the card being detected;
      size the virtual mouse input device according to a size of the business card and the parsed identifier;
      display the virtual mouse input device on the touch surface that encompasses borders of the business card that is placed on the touch surface;
      associate the virtual mouse input device with the identified user including setting a type of input that is driven by the virtual mouse input device;
      provide one or more applications associated with the virtual mouse input device, one of the one or more applications including selectable menu options for setting a type of input that is driven by the virtual mouse input device from a standard mouse input to one of: a stylus input; a trackball input; or a keyboard input; and
      receive input from the virtual mouse input device while the card remains on the touch surface; wherein the virtual mouse input device and a location of the card controls a location of a cursor on a different display from the touch surface; wherein the cursor includes a display that indicates the identified user.

15. The system of claim 14, further operative to: determine a boundary of the card and displaying the virtual mouse around the boundary of the card; and wherein the virtual mouse input device includes virtual options that comprise virtual options to select a type of input that is driven by the virtual mouse input device.

16. The system of claim 15, wherein the virtual options change in response to a context that is associated with a current application being interacted with by the virtual mouse input device.

17. The method of claim 1, wherein the identifier comprises a magnetic strip including data operable to identify the specific user.

18. The computer readable device of claim 8, further comprising:
   determining when a second business card is placed on the touch surface;
   creating a second virtual mouse input device in response to the second business card being detected by the touch input device, wherein the second virtual mouse input device is concurrently operable with the virtual mouse input device and is separately operable from the virtual mouse input device;
   sizing the second virtual mouse input device according to a size that is larger than the second business card;
   displaying the second virtual mouse input device at a location on the display of the touch input device around borders of the second business card that is updated in response to the location of the second business card changing;
   associating the second virtual mouse input device with a second user based on an identifier on the second business card, wherein the identifier comprises text on the second business card; and
   receiving input from the second virtual mouse input device while the second business card is on the touch surface, wherein the second virtual mouse input device controls a location of a second cursor.

19. The computer-readable storage device of claim 8, wherein setting the type of input for the virtual mouse input device is based on a user-preferred input type associated with the identifier.

20. The computer-readable storage device of claim 8, wherein the virtual mouse device is displayed until the business card is removed from the touch surface.

\* \* \* \* \*